L. GOLDSCHMIDT.
ROTATING PLOWING WHEEL FOR MOTOR PLOWS.
APPLICATION FILED FEB. 25, 1914.
1,232,025.
Patented July 3, 1917.
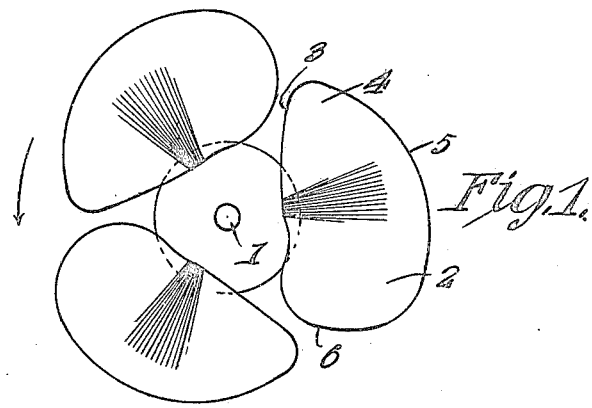
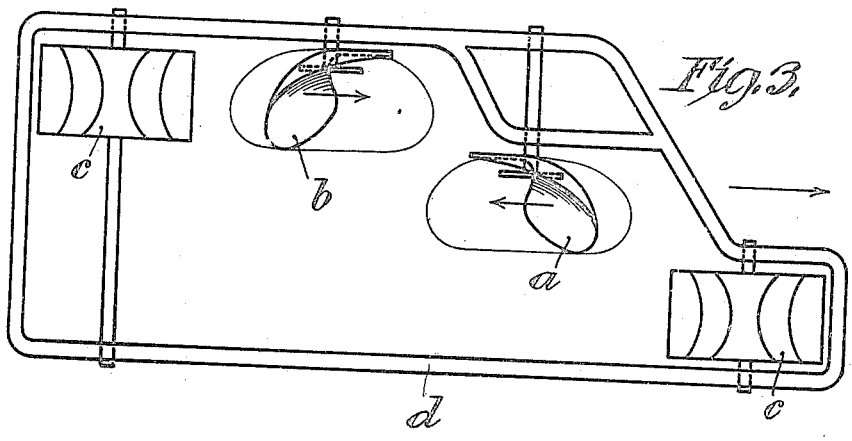
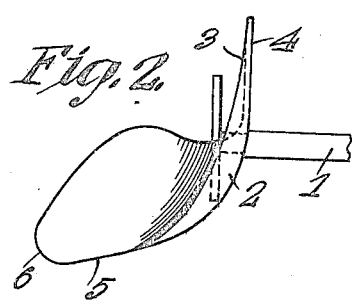

UNITED STATES PATENT OFFICE.

LOUIS GOLDSCHMIDT, OF COPENHAGEN, DENMARK.

ROTATING PLOWING-WHEEL FOR MOTOR-PLOWS.

1,232,025.   Specification of Letters Patent.   Patented July 3, 1917.

Application filed February 25, 1914. Serial No. 820,935.

*To all whom it may concern:*

Be it known that I, LOUIS GOLDSCHMIDT, a citizen of the Kingdom of Denmark, residing at Copenhagen, Denmark, and whose post-office address is No. 171 Gothersgade, Copenhagen, Denmark, have invented certain new and useful Improvements in Rotating Plowing-Wheels for Motor-Plows, of which the following is a specification.

The invention relates to improvements in and relating to rotating plowing wheels for motor plows. Apparatuses for treatment of ground are already well known, which consist of a wheel arranged in a frame upon one end of a motor driven axle, the direction of which is at a right angle to the driving direction of the apparatus.

With these known apparatuses, however, no actual plowing is effected, that is, they do not completely turn the earth, so that they are rather regarded as cultivators than as plows, or, on the other hand, should they be considered as plows, the power required for driving them would be very great, because of the fact that the earth must be elevated above the axle of the plow before being disposed again, and the cutting of the ground is effected in an irregular and consequently undesirable manner. In most of these known implements, the cutting operation is similar to that accomplished with a spade; at right angles to the direction of the furrow, and consequently, meeting with such obstacles on the surface of the ground as sticks, rocks, etc.

In the present invention, an actual plowing takes place, and the difficulties of former methods, are entirely obviated. The earth is completely turned and deposited without being elevated above the side of the wheel, the earth being loosened by a portion of the plow-wheel cutting a narrow groove in the earth parallel to the last plowed furrow at a distance equal to the width of one furrow. In order to effect the plowing in this manner, the plow-wheel consists of straight, forward portions at right angles to the axle for making the above mentioned parallel groove and a larger portion flared outwardly therefrom in the form of a winding surface for the purpose of depositing the earth to one side in a completely turned position.

With these and other objects in view, the invention consists of the novel features, combination and arrangement of parts, hereinafter more fully described, and pointed out in the claims.

In the drawings,

Figure 1 is a view of a plow-wheel looking in the direction of its rotating axle;

Fig. 2 is a top plan view of a single plow blade, showing the straight portion thereof at right angles to the axle; and Fig. 3 is a diagrammatic top plan view of a motor plow employing two of my improved plow-wheels.

In some respects, this plowing-wheel resembles, for instance, the propeller of a ship. In the drawing it is shown as composed of three independent blades secured on a circular plate, in order to make the idea of the invention easier to understand.

1 is a rotating axle disposed on the motor-plow, which axle carries a plowing-wheel formed of surfaces 2, which are combined of a smaller, plane portion 4, disposed at a right angle on the axle 1, and a larger portion bent in the form of a winding surface. The position of the axle 1 on the motor-plow is such that it is constantly at a right angle to the moving-direction of the motor-plow. Each surface 2 has an edge 3, which forms a limit for the plane portion 4 (Fig. 1) of the surface 2, and which is disposed essentially at a right angle to the direction of the axle 1. The edge 5 forms the limit for the portion of the surface 2, which is bent in the form of a winding surface.

The axle 1 rotates in the direction indicated by the arrow in Fig. 1. The edges 3, during this movement, cut down into a furrow or groove in the ground. After the edges 3 the plane portion 4 follows down into the said furrow, or groove. As the edges 5 recede from the portion 4, they cut the ground loose to a width corresponding to the width of the wheel, and form the bottom of the plow-furrow. The earth slides up along the winding portion of the surface 2, and is at the same time forced out laterally. At the moment when the earth reaches a height on a level with the axle 1, it has been turned to an angle of 90 degrees, and it now falls, actuated by the latter portion 6 and the edge 5, in a perfectly inverted position, over into the open adjacent furrow, and is simultaneously freed from the plowing-wheel.

It is possible to use two plowing-wheels on one and the same plow, according to the principle set forth above. In that case, the one of them looks exactly like the one shown in Figs. 1 and 2, while the winding portions of the other plowing-wheel are disposed on the opposite side of the plane portion 4. Thus the other plow-wheel is like a mirror-reflection of the one shown in Figs. 1 and 2.

Such an arrangement is shown diagrammatically in Fig. 3, in which *a* and *b* designate the two plow-wheels, of which the outline and a single blade are shown, *c* are the two driving wheels, and *d* the frame. The plow is carried forward in the direction of the arrow on the right hand side of the figure, and the plow-wheels *a* and *b* are rotated in directions opposite to each other as shown by the arrow on each wheel. The velocity of revolution of the wheel *b* must of course be greater than that of the wheel *a*. The wheel *c* goes in the furrow plowed during the last passage of the plow, said furrow now being filled up through the earth from the wheel *a*, whereas the hind wheel *c* goes in the furrow just plowed by the wheel *b*, said furrow remaining open until the following passage of the plow.

The portions of the shovels abutting against the disk are arched and the plowing wheel, comprising the disk and shovels, may have, for instance, the shape of a portion of a truncated spherical cap, which will facilitate the turning over and depositing of the earth into the adjacent furrow.

I claim:—

1. A rotating plowing wheel for motor plows, comprising a driving shaft at right angles to the driving direction of the plow, a disk mounted on the end of said shaft in a plane at right angles to said shaft, shovel blades mounted on the periphery of said disk having forward straight portions in a vertical plane parallel to the driving direction of the plow adapted to cut a groove in the earth to mark the width of the plow furrow, and outwardly flared portions from said straight portions forming winding surfaces adapted to loosen the earth and effect its deposition in a completely inverted position.

2. A rotating plowing-wheel for motor-plows, comprising a disk adapted to be rotated on a shaft at right angles to the driving direction of the plow, a plurality of shovel blades mounted on the periphery of said disk, having forward straight portions at right angles to said shaft, and outwardly flared portions from said straight forward portions forming winding surfaces, the said blades with the said disk having the shape of a portion of a truncated spherical cap.

In testimony that I claim the foregoing as my invention, I have signed my name in presence of two subscribing witnesses.

LOUIS GOLDSCHMIDT.

Witnesses:
 ERNEST BOUTARD,
 P. HOFMAN-BANGS.

Copies of this patent may be obtained for five cents each, by addressing the "Commissioner of Patents, Washington, D. C."